(12) United States Patent
Lai et al.

(10) Patent No.: US 11,259,635 B2
(45) Date of Patent: Mar. 1, 2022

(54) SEAT AND SEATBACK LINKAGE MECHANISM

(71) Applicant: AEROSPACE INDUSTRIAL DEVELOPMENT CORPORATION, Taichung (TW)

(72) Inventors: Chi-Heng Lai, Taichung (TW); Jinn-Biau Sheu, Taichung (TW); Chung-Li Huang, Taichung (TW); Hsiang-Suen Lin, Taichung (TW); Wen-Hwa Chen, Taichung (TW)

(73) Assignee: AEROSPACE INDUSTRIAL DEVELOPMENT CORPORATION, Taichung (TW)

( * ) Notice: Subject to any disclaimer, the term of this patent is extended or adjusted under 35 U.S.C. 154(b) by 0 days.

(21) Appl. No.: 16/916,140

(22) Filed: Jun. 30, 2020

(65) Prior Publication Data
US 2021/0401178 A1  Dec. 30, 2021

(51) Int. Cl.
| *A47C 1/032* | (2006.01) |
| *B60N 2/02* | (2006.01) |
| *B60N 2/20* | (2006.01) |
| *B60N 2/10* | (2006.01) |

(52) U.S. Cl.
CPC ............ *A47C 1/032* (2013.01); *B60N 2/0224* (2013.01); *B60N 2/10* (2013.01); *B60N 2/20* (2013.01)

(58) Field of Classification Search
CPC .............................. A47C 1/032; B60N 2/0224
USPC .................................................. 297/320, 340
See application file for complete search history.

(56) References Cited

U.S. PATENT DOCUMENTS

| 4,884,840 A | * | 12/1989 | Linden | ............... | A47C 1/03238 297/320 |
| 6,604,791 B1 | * | 8/2003 | Chen | .................. | A47C 1/03211 297/300.1 |
| 7,090,296 B2 | * | 8/2006 | Massimo | ........... | A47C 1/03211 297/320 |
| 7,484,803 B2 | * | 2/2009 | Dozsa-Farkas | .... | A47C 1/03255 297/320 |

\* cited by examiner

*Primary Examiner* — Anthony D Barfield
(74) *Attorney, Agent, or Firm* — Bruce Stone LLP; Joseph A. Bruce (57) ABSTRACT

A seat and seatback linkage mechanism includes: a pipe, a side bracket assembly, a seat, a seatback and driving source. The side bracket assembly includes a first side bracket and a second side bracket, and the pipe is mounted on the first and second side brackets. The seat is disposed between the first and second side brackets and includes a bottom surface, the bottom surface includes two first connecting portions and two second connecting portions, and the first connecting portions are pivotally connected to the first and second side brackets, respectively. The seatback is disposed between the first and second side brackets and connected to the second connecting portions of the seat, so that the seatback and the seat are drivingly connected to each other. The driving source is connected to one end of the seatback that is adjacent to the pipe to drive the driven end to move.

8 Claims, 8 Drawing Sheets

SEAT AND SEATBACK LINKAGE MECHANISM

BACKGROUND

Field of the Invention

The present invention relates to a chair, and more particularly to a chair whose recline angle can be adjusted.

Related Prior Art

Figure 1:
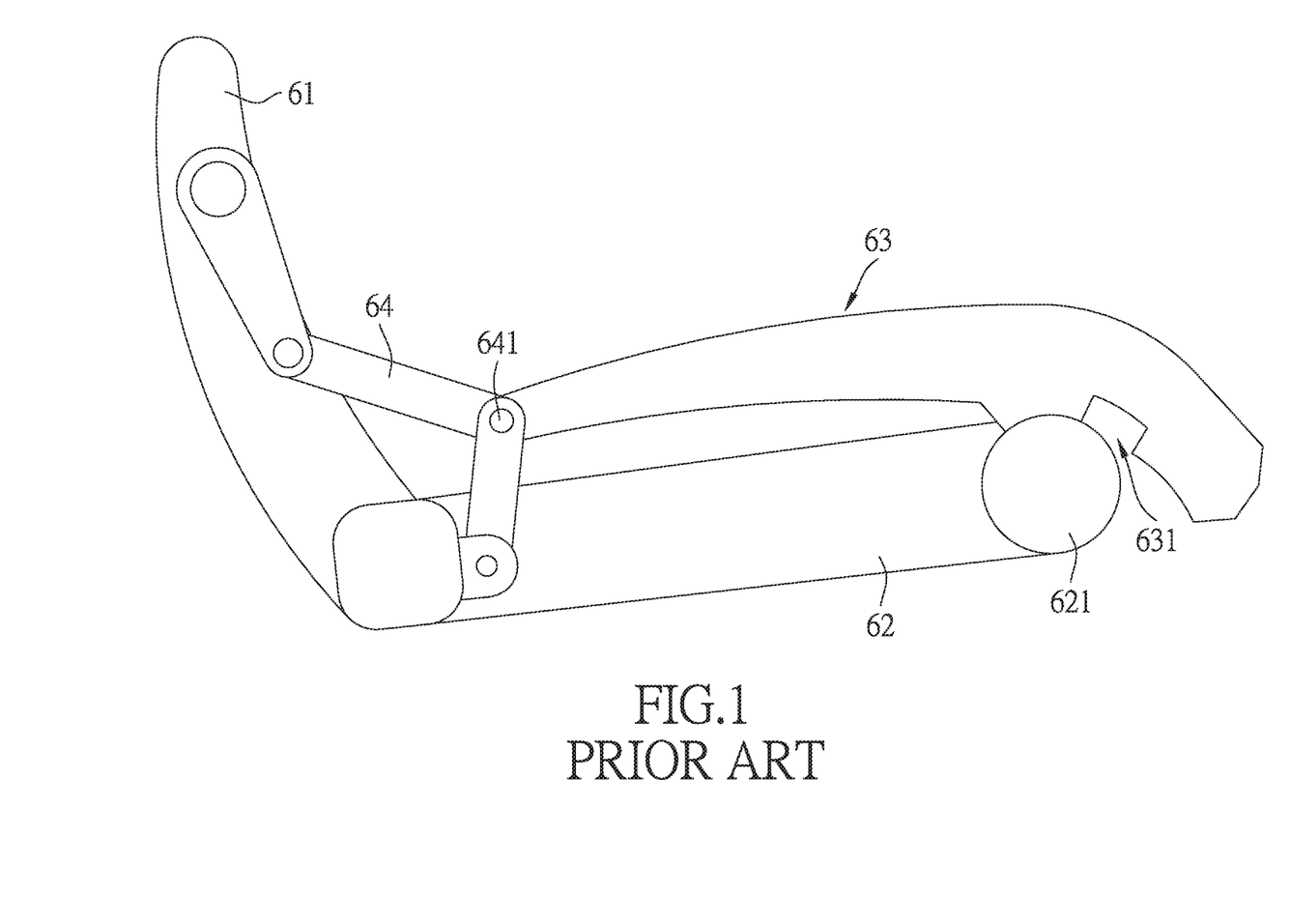
FIG. 1 is an illustrative view of the conventional technology.

The chairs of most vehicles are designed such that the inclination angle of the seatback is adjustable. In particular, there is such a kind of chair that the inclination angle of the seatback and the seat can both be adjusted simultaneously. During the reclining of the seatback, the seat has a corresponding amount of displacement, and the conventional seat and seatback linkage mechanisms have various forms of designs. As shown in FIG. 1, which shows one of the designs, including:

A first seatback unit 61, a first fixed seat 62, a first movable seat 63 and a first link assembly 64. The first seatback unit 61 is connected to the first fixed seat 62, the first link assembly 64 has two ends pivotally connected to the first seatback unit 61 and one end of the first fixed seat 62, respectively. A pivot point 641 is provided between the two ends of the first link assembly 64 and connected to one end of the first movable seat 63, so that, when the user controls the first seatback unit 61 to recline, the pivot point 641 of the first link assembly 64 can drive the first movable seat 63 to correspondingly move backwards. In addition, another end of the first fixed seat 62 that is not connected to the first seatback unit 61 is provided with a first seat pipe 621, the first movable seat 63 is provided on one side thereof facing the first seat pipe 621 with a clamping slot 631, and the first movable seat 63 moves until the clamping slot 631 is engaged with the first seat pipe 621.

Figure 2:
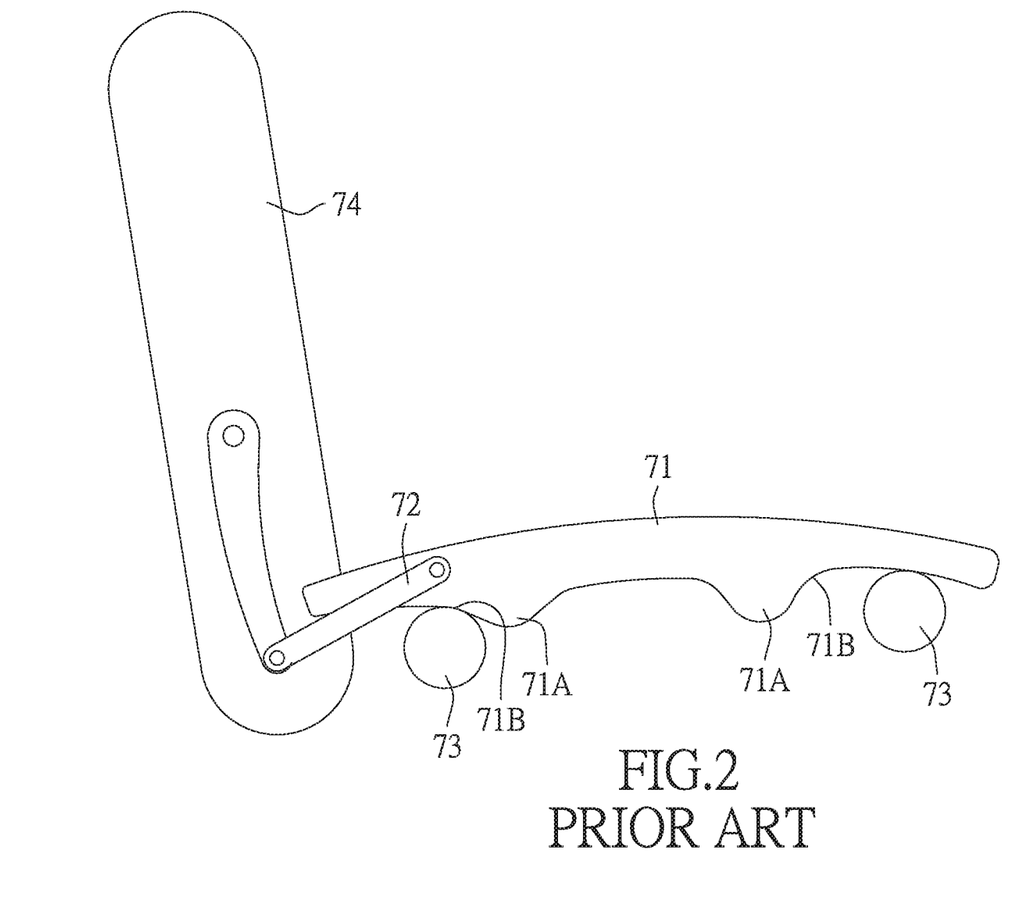
FIG. 2 is an illustrative view of the conventional technology.

Another structural design of the conventional seat and seatback linkage mechanisms is shown in FIG. 2, including: A second movable seat 71, a second link assembly 72 and two second seat pipes 73. The second link assembly 72 has two ends pivotally connected to a second seatback unit 74 and the second movable seat 71, respectively. The second movable seat 71 is disposed on the two second seat pipes 73 and provided on one side thereof facing the two second seat pipes 73 with two locking protrusions 71A, and two sides of each of the locking protrusions 71A are respectively connected with an arc surface 71B. When the user controls the second seatback unit 74 to recline, the second link assembly 72 drives the second movable seat 71 to move, so that the end of the second movable seat 71 close to the second seatback unit 74 moves downward along the arcs of the arc surfaces 71B to achieve the effect of linkage.

Figure 3:
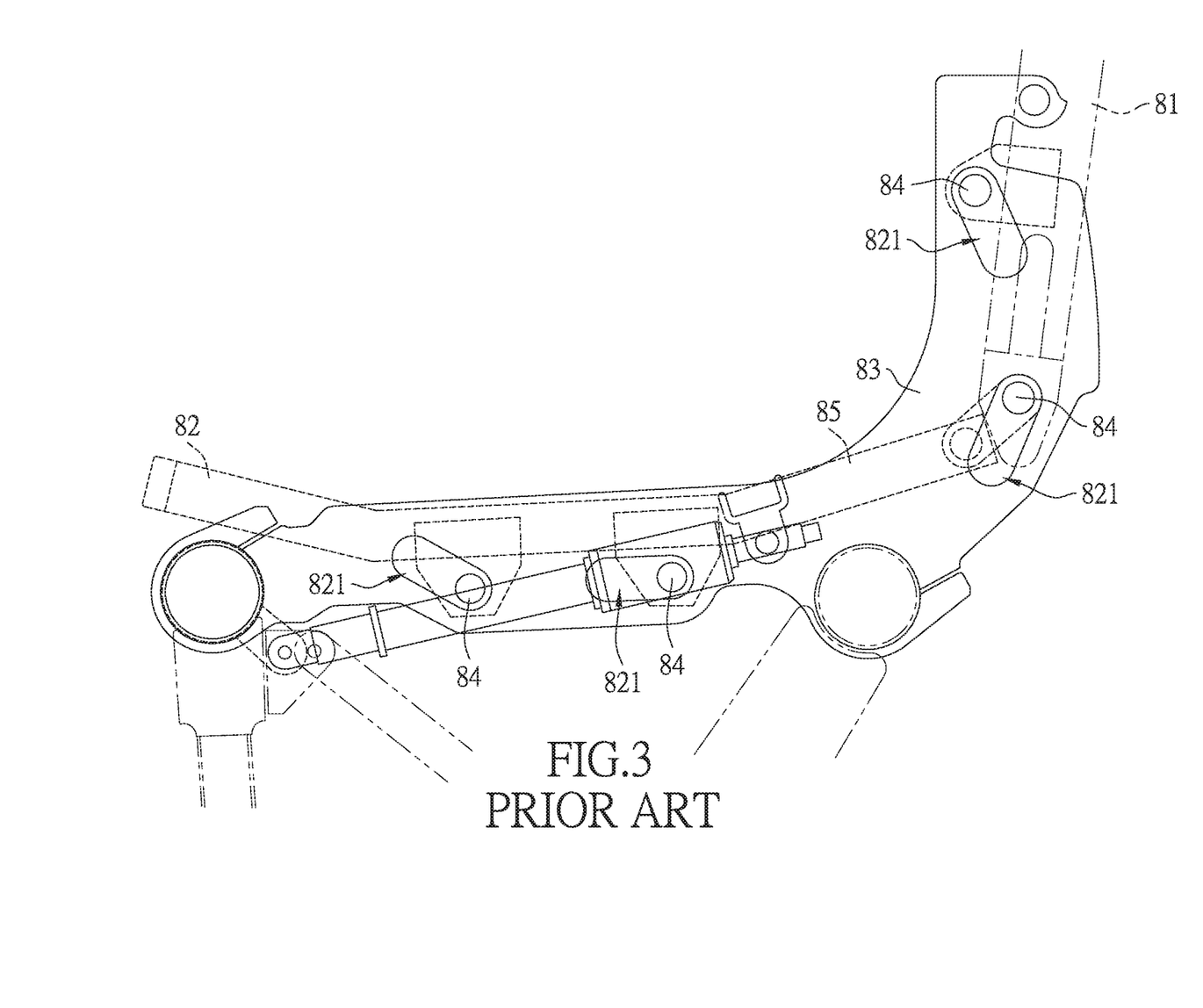
FIG. 3 is an illustrative view of the conventional technology.
Figure 4:
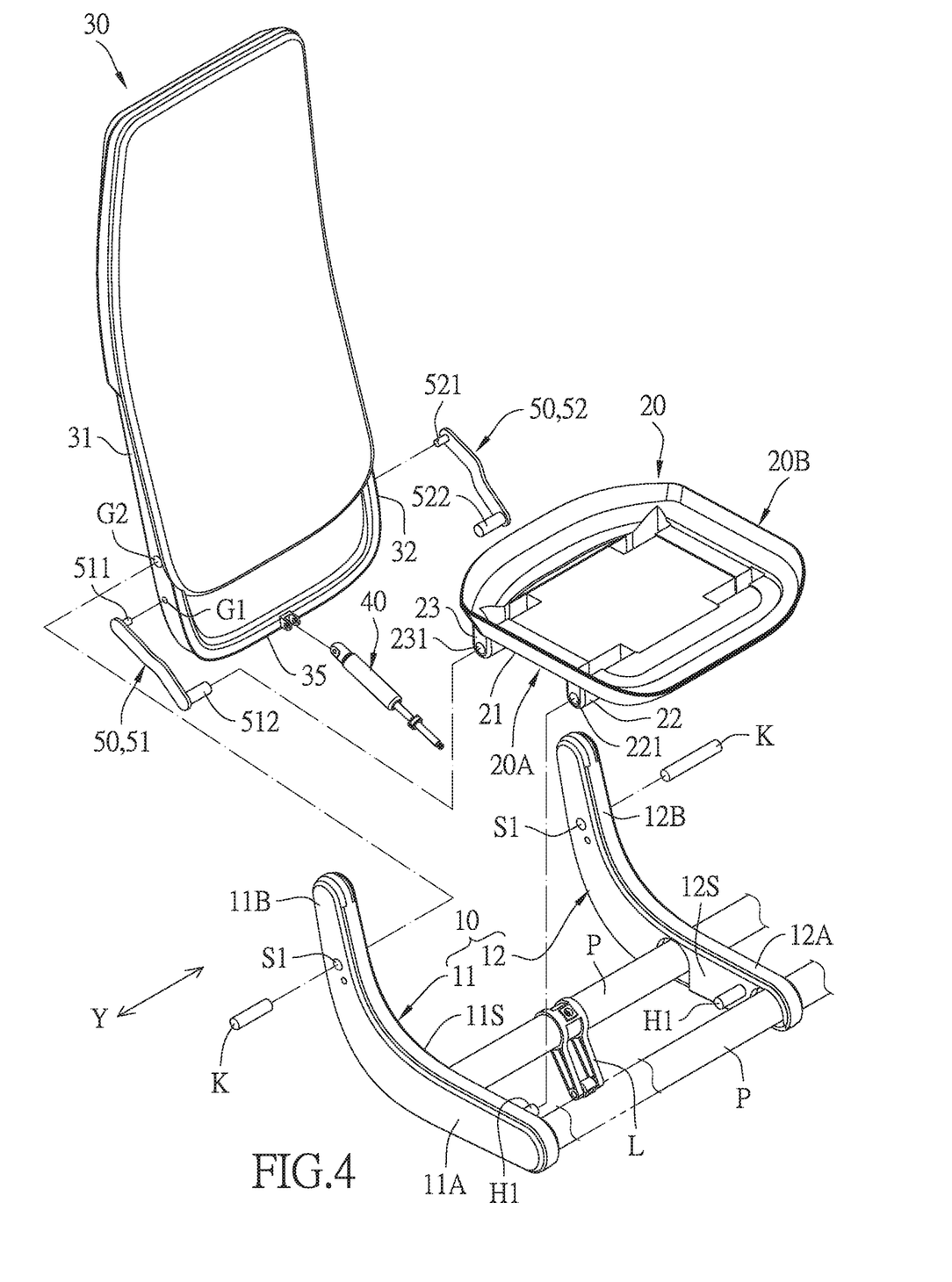
FIG. 4 is an exploded view of the present invention.
Figure 5:
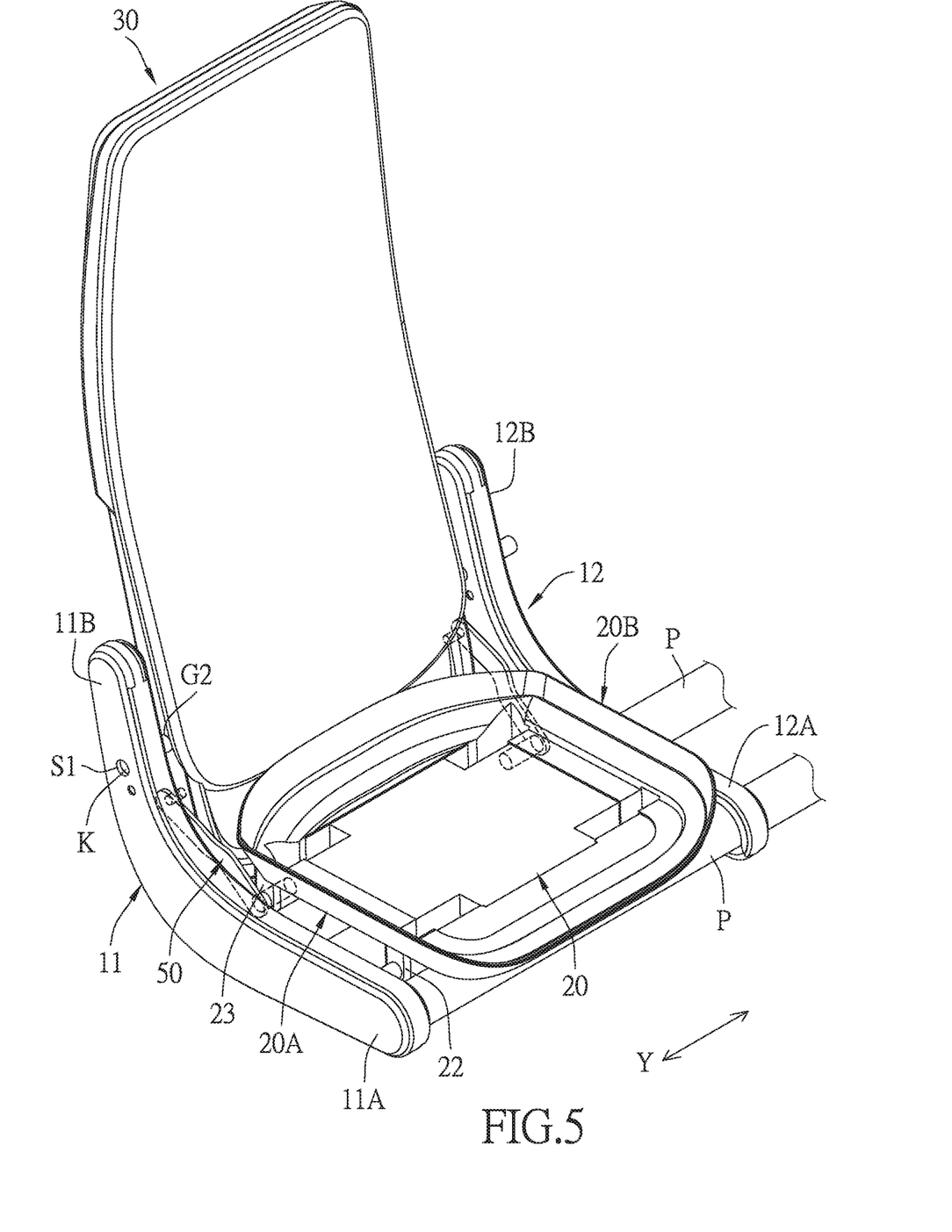
FIG. 5 is a perspective view of the present invention.
Figure 6:
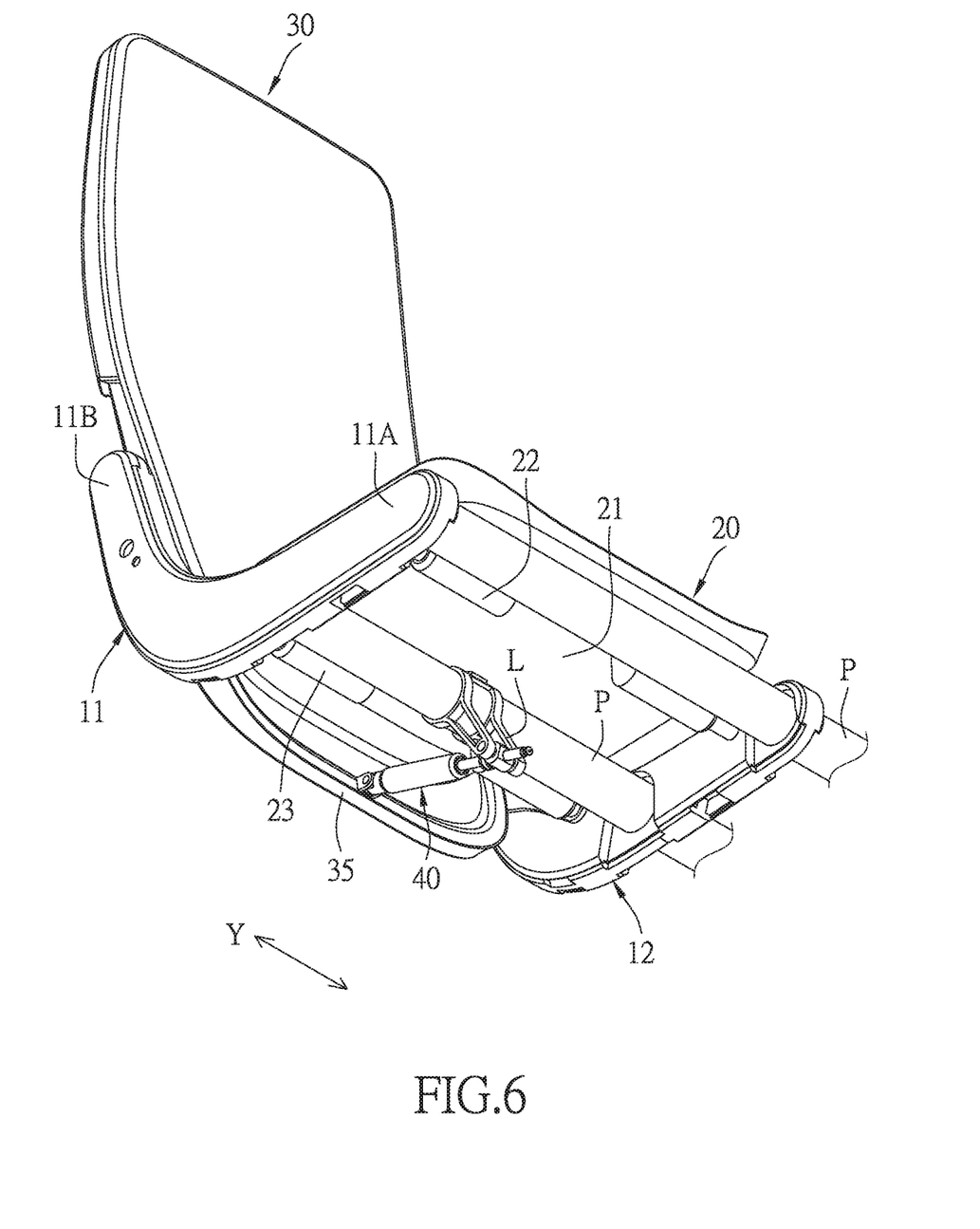
FIG. 6 is a perspective view of the present invention from another angle of view.

Another structural design of the conventional seat and seatback linkage mechanisms is shown in FIG. 3, including:

A third seatback unit 81, a third movable seat 82, a seat portion 83 and a plurality of bolts 84. The third movable seat 82 is provided with a plurality of elongated slots 821, the third seatback unit 81 is provided with two bolts 84, the third movable seat 82 is also provided with two bolts 84, and each of the bolts 84 is slidably disposed in a corresponding one of the elongated slots 821. When the third seatback unit 81 is reclined, it drives the third movable seat 82 to move through a third link assembly 85, and the third movable seat 82 is guided by the elongated slots 821 to move backward and downward.

As can be seen from the foregoing, when the conventional seat and seatback linkage mechanism is in use, the seat will protrude forward and tilt up correspondingly when the seatback of the chair is reclined. However, the distance between the rows of the seats of general public transportation, such as airplanes and high-speed trains, is quite narrow, and passengers often do not have enough room to stretch their feet when seated, so that when the seatback is reclined, the seat moves further forward, which will reduce the space in front of the passengers, thereby negatively affecting the passengers' experience. Therefore, there is a need for a seat and seatback linkage mechanism that can maintain the space in front of the passengers during seat reclining.

The present invention has arisen to mitigate and/or obviate the afore-described disadvantages.

SUMMARY

The present invention provides a seat and a seat back linkage mechanism, and the main objective of which is to provide a link mechanism in a limited space inside the chair to achieve the following two effects after the seatback is reclined.

First, the occupant's hips move downward along with the seat, while his/her knees do not move forward or upward to maintain the original seating space, and so as not to affect the original stretching space of the feet.

Secondly, during reclining process, design an average force driving mechanism device to keep the hips of the occupant lying at the original position without moving or shaking left and right, which also improves the stability of the seatback structure.

To achieve the above objective, a seat and seatback linkage mechanism in accordance with the invention comprises:

at least one pipe;

a side bracket assembly including a first side bracket and a second side bracket which are separated by a distance, wherein the at least one pipe is mounted on the first side bracket and the second side bracket, the first side bracket and the second side bracket each include a first section and a second section connected to the first section, and the first sections and the second sections extend in different directions, the at least one pipe is mounted on the first sections of the first side bracket and the second side bracket;

a seat disposed between the first side bracket and the second side bracket and mounted on the pipe, wherein the seat includes a bottom surface facing the pipe and has a first end and a second end, the bottom surface includes two first connecting portions and two second connecting portions, one of the first connecting portions and one of the second connecting portions are located at the first end, and another of the first connecting portions and another of the second connecting portions are located at the second end, the first connecting portion at the first end is pivotally connected to the first side bracket, and the first connecting portion at the second end is pivotally connected to the second side bracket;

a seatback disposed between the first side bracket and the second side bracket and pivotally disposed on the first and second side brackets, wherein the seatback is connected to the second connecting portions of the seat, so that the seatback and the seat are drivingly connected to each other; and a driving source connected to one end of the seatback that is adjacent to the pipe, defining the one end of the seatback that is adjacent to the pipe as a driven end, and the driving source is used to drive the driven end to move.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

DETAILED DESCRIPTION

Referring to FIGS. 4 to 8, a seat and seatback linkage mechanism in accordance with the present invention comprises the following components:

At least one pipe P extends along a lateral direction Y. In this embodiment, the pipe P is a hollow cylinder.

A side bracket assembly 10 includes a first side bracket 11 and a second side bracket 12 which are separated by a distance, and the pipe P is mounted on the first side bracket 11 and the second side bracket 12. The first side bracket 11 and the second side bracket 12 are generally L-shaped and identical in shape. The first side bracket 11 and the second side bracket 12 each have a first section 11A, 12A and a second section 11B, 12B connected to the first section 11A, 12A, and the first section 11A, 12A and the second section 11B, 12B extend in different directions. The pipe P is mounted on the first section 11A, 12A of the first side bracket 11 and the second side bracket 12.

In this embodiment, the first side bracket 11 and the second side bracket 12 are arranged along the lateral direction Y. In one embodiment, the pipe P has two ends disposed on the first side bracket 11 and the second side bracket 12, respectively. In another embodiment, the pipe P penetrates the first side bracket 11 and the second side bracket 12.

A seat 20 is disposed between the first side bracket 11 and the second side bracket 12 and mounted on the pipe P. The seat 20 includes a bottom surface 21 which faces the pipe P and has a first end 20A and a second end 20B, and an extending direction between the first end 20A and the second end 20B is the lateral direction Y. The bottom surface 21 includes two first connecting portions 22 and two second connecting portions 23, one of the first connecting portions 22 and one of the second connecting portions 23 are located at the first end 20A, and another of the first connecting portions 22 and another of the second connecting portions 23 are located at the second end 20B. The first connecting portions 22 are separated from the second connecting portions 23 by a distance, the first connecting portion 22 at the first end 20A is pivotally connected to the first side bracket 11, and the first connecting portion 22 at the second end 20B is pivotally connected to the second side bracket 12, so that the seat 20 can pivot about the first connecting portions 22. In a preferred embodiment, the first side bracket 11 and the second side bracket 12 each include an inner surface 11S, 12S, and the inner surface 11S of the first side bracket 11 and the inner surface 12S of the second side bracket 12 face each other. The first side bracket 11 and the second side bracket 12 are each provided on the inner surfaces 11S, 12S of the first sections 11A, 12A with a pivot H1, and the first connecting portions 22 each are provided with a first assembling hole 221 for insertion of the pivots H1.

In a preferred embodiment, the number of the pipes P is two, the two pipes P are arranged in parallel and separated by a distance, and the pivots H1 are located between the two pipes P.

A seatback 30 is disposed between the first side bracket 11 and the second side bracket 12 and pivotally disposed on the first and second side brackets 11, 12. The seatback 30 is connected to the second connecting portions 23 of the seat 20 so that the seatback 30 and the seat 20 can be drivingly connected to each other. The seatback 30 includes a first lateral surface 31 and a second lateral surface 32 which are opposite sides of the seatback 30 along the lateral direction Y.

A driving source 40 is connected to one end of the seatback 30 that is adjacent to the pipe P, defining the one end of the seatback 30 that is adjacent to the pipe P as a driven end 35, and the driving source 40 is used to drive the driven end 35 to move, consequently making the seatback 30 pivot. In this embodiment, the driving source 40 is a pressing cylinder, one end of the driving source 40 is coupled to the driven end 35 of the seatback 30, and another end of the driving source 40 is fixed to the pipe P through a lock L.

Preferably, the second connecting portions 23 are closer to the seatback 30 than the first connecting portions 22.

In the preferred embodiment, the invention further includes two connecting rods 50, which are a first connecting rod 51 and a second connecting rod 52, the first connecting rod 51 has two ends connected to the first lateral surface 31 of the seatback 30 and the second connecting portion 23 at the first end 20A of the seat 20, respectively, and the second connecting rod 52 has two ends connected to the second lateral surface 32 of the seatback 30 and the second connecting portion 23 at the second end 20B of the seat 20, respectively.

In a preferred embodiment, the first lateral surface 31 and the second lateral surface 32 each are provided with a first through hole G1, each of the second connecting portions 23 is provided with a second assembling hole 231, and the first and second connecting rods 51, 52 are each provided at one end thereof with a first protrusion 511, 521, and at another end thereof with a second protrusion 512, 522. The first protrusion 511 of the first connecting rod 51 is inserted in the first through hole G1 in the first lateral surface 31, the second protrusion 512 of the first connecting rod 51 is inserted into the second assembling hole 231 of the second connecting portion 23 at the first end 20A, the first protrusion 521 of the second connecting rod 52 is inserted into the first through hole G1 in the second lateral surface 32, and the second protrusion 522 of the second connecting rod 52 is inserted into the second assembling hole 231 of the second connecting portion 23 at the second end 20B.

In a preferred embodiment, the second sections 11B, 12B of the first side bracket 11 and the second side bracket 12 each have a pivot hole S1, and the first lateral surface 31 and the second lateral surface 32 each have a second through hole G2 which is adjacent to the first through hole G1. The first through holes G1 are closer to the first sections 11A and 12A than the second through holes G2, and two pins K are inserted in the pivot holes Si and the second through holes G2, so that the seatback 30 is pivotally mounted on the first side bracket 11 and the second side bracket 12.

Figure 7:
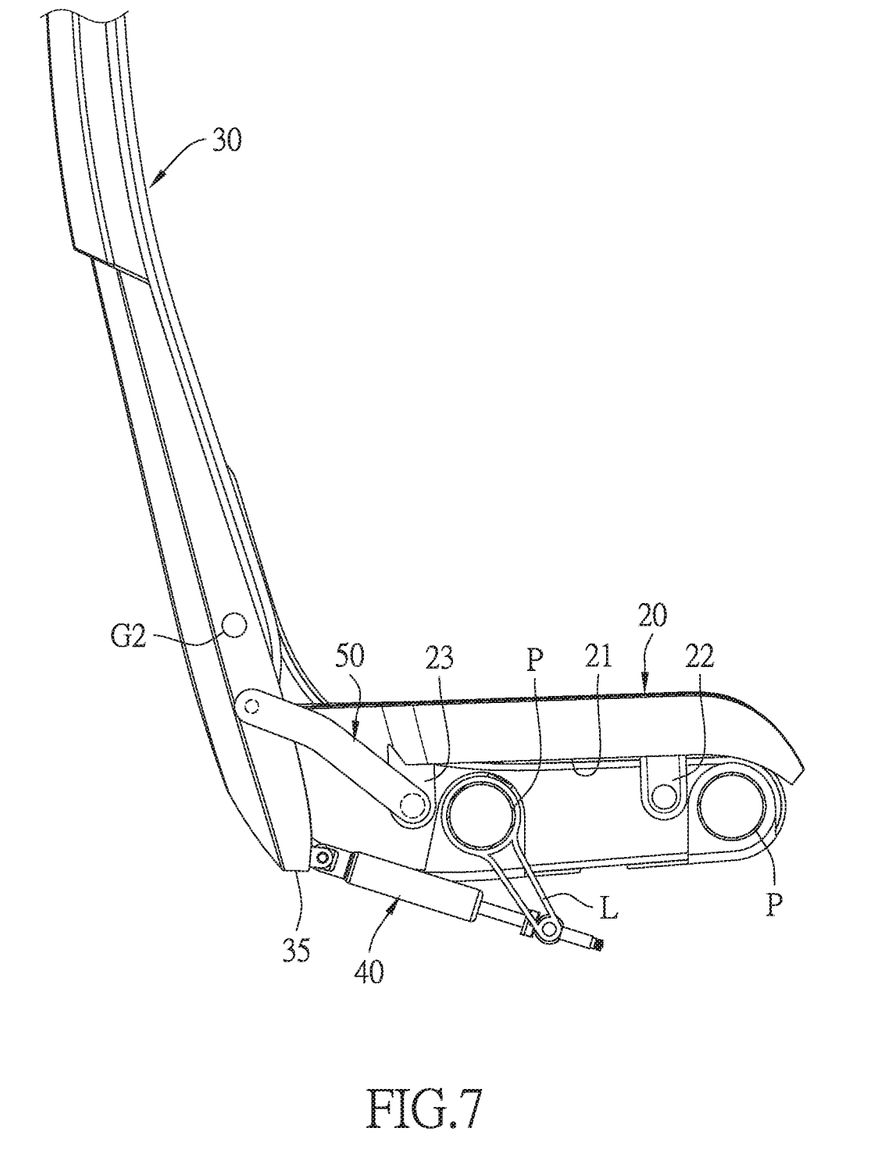
FIG. 7 is an operational view of the seat and seatback linkage mechanism of the chair in accordance with the present invention.
Figure 8:
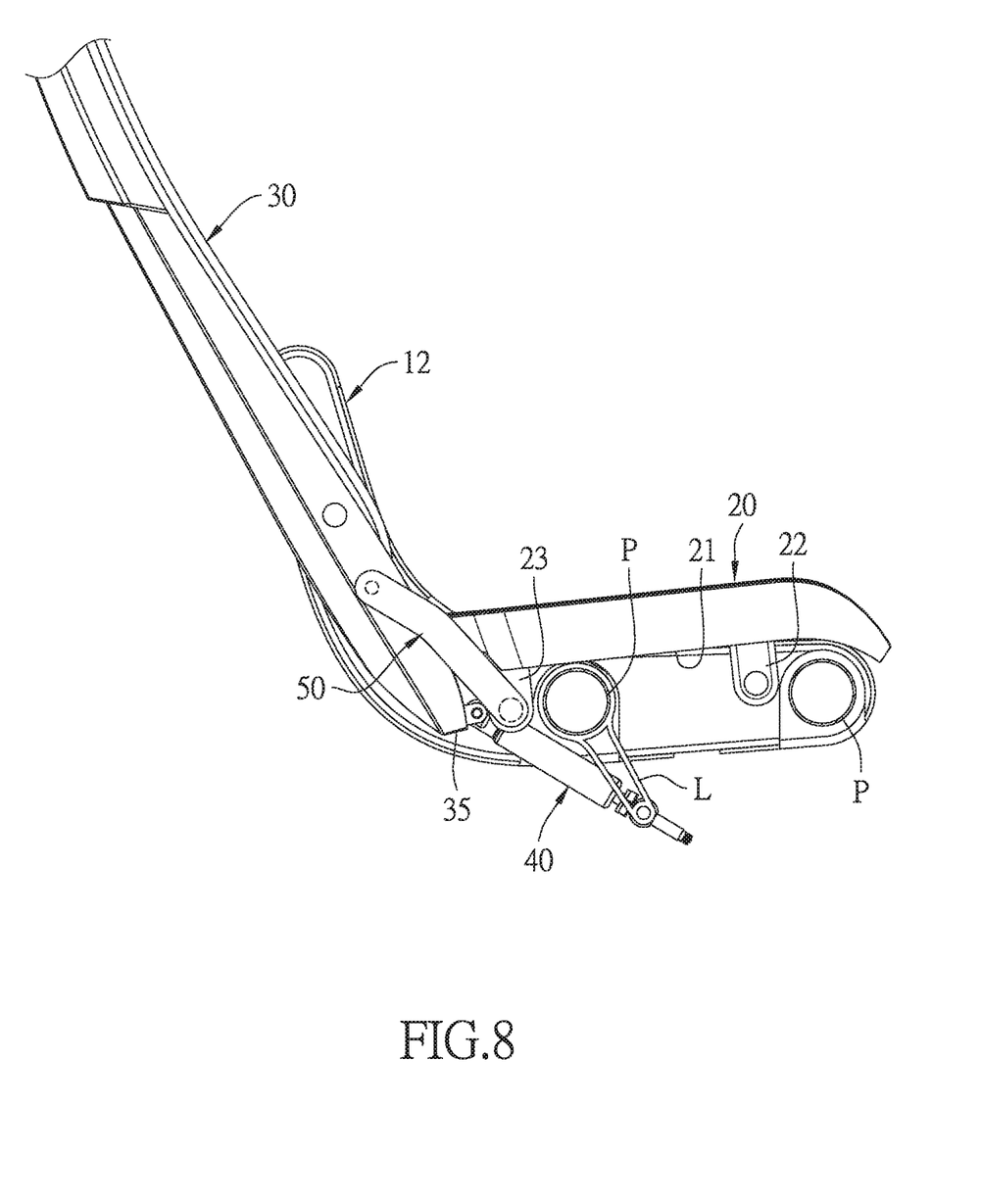
FIG. 8 is an operational view of the seat and seatback linkage mechanism of the chair in accordance with the present invention.

As can be seen from the foregoing, the present invention mainly drives the seatback 30 to pivot by the driving source 40, and the seatback 30 and the seat 20 are driving connected by the first and second connecting rods 51, 52. When the seatback 30 pivots, the first and second connecting rods 51, 52 drive the second connecting portions 23 to move, which causes the end of the seat 20 adjacent to the seatback 30 to move downward while driving the end of the seat 20 that is away from the seatback 30 to tilt upward, thereby preventing the seatback from moving back and forth during seat reclining.

While we have shown and described various embodiments in accordance with the present invention, it is clear to those skilled in the art that further embodiments may be made without departing from the scope of the present invention.

What is claimed is:

1. A seat and seatback linkage mechanism comprising:
   at least one pipe;
   a side bracket assembly including a first side bracket and a second side bracket which are separated by a distance, wherein the at least one pipe is mounted on the first side bracket and the second side bracket, the first side bracket and the second side bracket each include a first section and a second section connected to the first section, and the first sections and the second sections extend in different directions, the at least one pipe is mounted on the first sections of the first side bracket and the second side bracket;
   a seat disposed between the first side bracket and the second side bracket and mounted on the pipe, wherein the seat includes a bottom surface facing the pipe, and the seat has a first end and a second end, the bottom surface includes two first connecting portions and two second connecting portions, one of the first connecting portions and one of the second connecting portions are located at the first end, and another of the first connecting portions and another of the second connecting portions are located at the second end, the first connecting portion at the first end is pivotally connected to the first side bracket, and the first connecting portion at the second end is pivotally connected to the second side bracket;
   a seatback disposed between the first side bracket and the second side bracket and pivotally disposed on the first and second side brackets, wherein the seatback is connected to the second connecting portions of the seat, so that the seatback and the seat are drivingly connected to each other; and
   a driving source connected to one end of the seatback that is adjacent to the pipe, defining the one end of the seatback that is adjacent to the pipe as a driven end, and the driving source is used to drive the driven end to move.

2. The seat and seatback linkage mechanism as claimed in claim 1, wherein the at least one pipe extends along a lateral direction, the first side bracket and the second side bracket are arranged along the lateral direction, and an extending direction between the first end and the second end is the lateral direction.

3. The seat and seatback linkage mechanism as claimed in claim 1, wherein the first side bracket and the second side bracket each include an inner surface, and the inner surface of the first side bracket and the inner surface of the second side bracket face each other, the first side bracket and the second side bracket are each provided on the inner surfaces of the first sections with a pivot, and the first connecting portions each are provided with a first assembling hole for insertion of the pivots.

4. The seat and seatback linkage mechanism as claimed in claim 3, wherein the number of the at least one pipe is two, the two pipes are arranged in parallel and separated by a distance, and the pivots are located between the two pipes.

5. The seat and seatback linkage mechanism as claimed in claim 1, wherein the driving source is a pressing cylinder, one end of the driving source is coupled to the driven end of the seatback, and another end of the driving source is fixed to the at least one pipe through a lock.

6. The seat and seatback linkage mechanism as claimed in claim 1, wherein the seatback includes a first lateral surface and a second lateral surface, a first connecting rod has two ends connected to the first lateral surface of the seatback and the second connecting portion at the first end of the seat, respectively, and a second connecting rod has two ends connected to the second lateral surface of the seatback and the second connecting portion at the second end of the seat, respectively.

7. The seat and seatback linkage mechanism as claimed in claim 6, wherein the first lateral surface and the second lateral surface each are provided with a first through hole, each of the second connecting portions is provided with a second assembling hole, the first and second connecting rods are each provided at one end thereof with a first protrusion, and at another end thereof with a second protrusion, the first protrusion of the first connecting rod is inserted in the first through hole in the first lateral surface, the second protrusion of the first connecting rod is inserted into the second assembling hole of the second connecting portion at the first end, the first protrusion of the second connecting rod is inserted into the first through hole in the second lateral surface, and the second protrusion of the second connecting rod is inserted into the second assembling hole of the second connecting portion at the second end.

8. The seat and seatback linkage mechanism as claimed in claim 1, wherein the second sections of the first side bracket and the second side bracket each have a pivot hole, and the first lateral surface and the second lateral surface each have a second through hole which is adjacent to the first through hole, the first through holes are closer to the first sections than the second through holes, and two pins are inserted in the pivot holes and the second through holes, so that the seatback is pivotally mounted on the first side bracket and the second side bracket.

* * * * *